No. 646,818. Patented Apr. 3, 1900.
M. FESLER.
BICYCLE BRAKE.
(Application filed June 10, 1899.)
(No Model.)
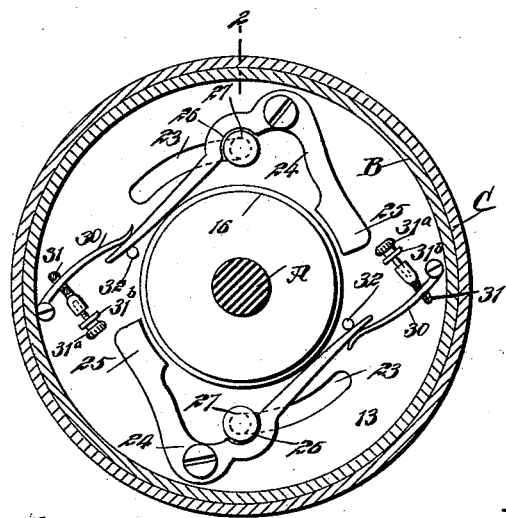
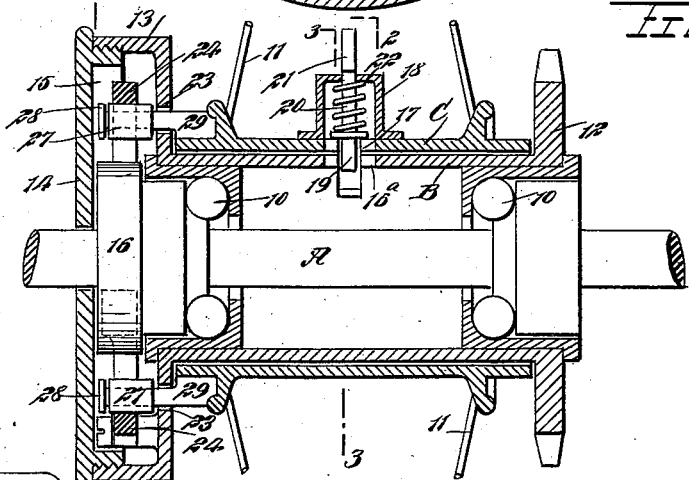
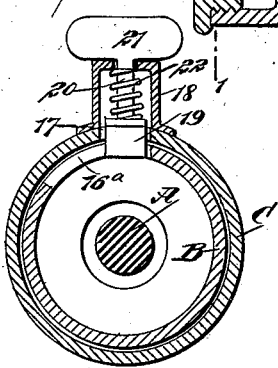
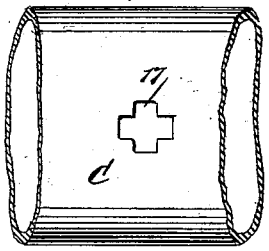
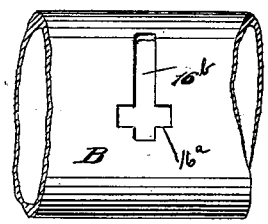
WITNESSES:
H. W. Walker
INVENTOR
Martin Fesler
BY
ATTORNEYS
THE NORRIS PETERS CO., PHOTO-LITHO., WASHINGTON, D. C.

UNITED STATES PATENT OFFICE.

MARTIN FESLER, OF SALT LAKE CITY, UTAH.

BICYCLE-BRAKE.

SPECIFICATION forming part of Letters Patent No. 646,818, dated April 3, 1900.

Application filed June 10, 1899. Serial No. 720,042. (No model.)

*To all whom it may concern:*

Be it known that I, MARTIN FESLER, of Salt Lake City, in the county of Salt Lake and State of Utah, have invented a new and Improved Bicycle-Brake, of which the following is a full, clear, and exact description.

One object of my invention is to provide a brake which constitutes a portion of the hub of a wheel and which can instantly be brought into action by back-pedaling.

A further object of the invention is to provide a brake of the character stated that will be concealed and protected and also to provide means for locking the brake in an open or inoperative position when desired.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a transverse section taken practically on the line 1 1 of Fig. 2, illustrating the brake-levers in front elevation. Fig. 2 is a longitudinal section through the hub of a wheel and through the brake mechanism, the section being taken on the line 2 2 of Fig. 1. Fig. 3 is a transverse section taken substantially on the line 3 3 of Fig. 2. Fig. 4 is a perspective view of a portion of the wheel-hub to which the spokes are attached, and Fig. 5 is a similar view of a sleeve adapted to be loosely fitted in the hub shown in Fig. 4.

A represents the axle of the rear wheel of a bicycle, B a sleeve provided with ball-bearings 10, that engage with the axle, and C represents the hub proper of a bicycle-wheel, to which the spokes 11 are secured, the hub C being loosely mounted on the sleeve B. The sleeve B is provided with a sprocket-wheel 12 at one end and with a box-flange 13 at the opposite end, and said box-flange is provided in its turn with a cap or cover 14. Within the chamber 15, formed by the box-flange 13 and this cap or cover, an annular flange 16 is formed upon the axle A, as shown in Figs. 1 and 2. A cruciform slot $16^a$ is made in the central portion of the sleeve B, and one member of this slot $16^a$ is much longer than the other three members, which latter members are of about the same dimensions. A registering cruciform slot 17 is formed in the hub C, adapted to register with the slot $16^a$ in the sleeve; but the members of the slot 17 are all of the same dimensions. A casing 18 is erected on the hub C over the slot 17, and the flat head 19 of a pin 20 is made to enter both of the slots $16^a$ and 17, as shown in Figs. 2 and 3. The said pin outside of the casing 18 is provided with a handle 21, while a spring 22 is located within the casing, having bearing against the head 19 and the under face of the top portion of the casing. When the head 19 of the pin 20 is turned longitudinally of the sleeve B and hub C, these two parts are locked together; but when the head 19 is turned diametrically of the sleeve and the hub one of said parts will have limited movement upon the other.

Two diametrically-curved slots 23 are made in the side surface of the box-flange 13, and adjacent to each of the slots 23 an angle brake-lever 24 is fulcrumed upon the inner face of the said box-flange 13, as is best shown in Fig. 1. A brake-shoe or bearing-surface 25 is formed at each end of each brake-lever, and said shoes or brake-surfaces 25 are adapted for engagement with the axle-flange 16. The opposite member of each brake-lever is provided with a recess 26 in its inner face, and these recesses receive rollers 27, that are mounted upon pins 28, which pins extend through the slots 23 in the box-flange, and the outer ends 29 of the pins 28 are secured to the outer surface of the hub C, as is shown best in Fig. 2. When the rollers 27 are in the recesses 26, the brake shoes or surfaces 25 of the brake-levers are held out of engagement with the axle-flange 16, and this position is the normal position of the brake-levers. Said levers are held in their normal position by springs 30, that bear upon the outer face of the members of the levers in which the recesses 26 are made, as shown in Fig. 1. The tension of the springs 30 is controlled by passing stirrups 31 over the springs, said stirrups having interiorly-threaded sockets at their inner ends, as shown in Fig. 1, and set-screws $31^a$, mounted to turn in bearings $31^b$ upon the box-flange, are made to enter said sockets. Thus by manipulating the set-screws $31^a$ more or less pressure may be brought to bear upon the brake-levers 24. Pins 32 are provided that limit the movement of the tension-controlled members of the brake-levers, as is also shown in Fig. 1.

In operation, the hub C being set to turn on the sleeve B, when it is desired to apply the brakes all that is necessary is for the rider to back-pedal, whereupon the tendency of the wheel to travel forward will carry the rollers 26 on the pins 28 toward the spring-controlled ends of the brake-levers, thus applying the brake-shoes or brake-surfaces 25 to the axle-flange 16. When straight-ahead pedaling is resumed, the brake will be instantly taken off from the axle and the rollers 27 will again enter the recesses 26 in the brake-levers. The recesses 26 are made in the brake-levers, and the rollers are made to enter said recesses in order that there shall be some slight resistance when the brake is applied, so that the operator may be made aware that the brake is in working order.

Having thus described my invention, I claim as new and desire to secure by Letters Patent—

1. An axle, a support adapted to rotate, a hub having limited movement on said support, spring-controlled bell-crank brake-levers carried by said support, and extensions from the hub in operative engagement with said levers, as and for the purpose specified.

2. The combination, with an axle having an annular flange, a support adapted to rotate, said support being provided with a casing, and tension-controlled bell-crank brake-levers mounted in the casing, each lever being provided with a recess in one of its faces, of a hub having limited movement upon said support, extensions from the hub, which extensions pass through slots in said casing, and rollers on said extensions adapted to engage with said levers and enter the recesses therein, as described.

3. In a brake, the combination with an axle having an annular flange, of a sleeve having a housing at one end one wall of which is provided with curved slots, a hub mounted on the sleeve to have limited movement thereon, pivoted and spring-pressed bell-crank levers mounted in the housing of the sleeve and adapted to engage the flange of the axle, and projections carried by the hub and projecting into the housing of the sleeve and engaging the brake-levers, substantially as described.

4. In a brake, the combination with an axle having an annular flange, of a sleeve on the axle and having a housing at one end, the inner wall of the housing being provided with curved slots, pivoted and spring-pressed bell-crank brake-levers mounted in the housing and having one member adapted to engage the flange of the axle and provided with a recess in its other member, a hub mounted to have limited movement on the sleeve, pins secured to the hub and projecting through the slots of the said housing, and rollers on the inner ends of the said pins, substantially as described.

5. In a brake, the combination of a sleeve having a cruciform slot, one member of which is longer than the others, a hub mounted on the sleeve and having a cruciform slot, and a spring-pressed pin having a head wider than the width of the slots and projecting into the said slots, substantially as described.

6. In a brake an axle having an annular flange, a sleeve mounted on the axle and provided with a box-flange at one end, said flange being formed with curved slots, a cap or cover for the flange, angular and spring-pressed brake-levers mounted on the flange of the sleeve and having one member adapted to engage the flange of the axle, a hub mounted on the sleeve, means for locking the hub to the sleeve so that it will have limited movement thereon, and pins carried by the hub and projecting through the slots of the flange of the sleeve and engaging the other members of the brake-levers, substantially as described.

MARTIN FESLER.

Witnesses:
A. B. FARLEY,
B. S. HARRINGTON.